(12) United States Patent
Vohrer

(10) Patent No.: US 6,971,414 B2
(45) Date of Patent: Dec. 6, 2005

(54) FLEXIBLE CONDUIT, PARTICULARLY FOR SANITARY PURPOSES

(75) Inventor: Christoph Vohrer, Königstein (DE)

(73) Assignee: VOHRAN Patentverwertungs-GmbH, Königstein (DE)

( * ) Notice: Subject to any disclaimer, the term of this patent is extended or adjusted under 35 U.S.C. 154(b) by 251 days.

(21) Appl. No.: 10/622,168

(22) Filed: Jul. 17, 2003

(65) Prior Publication Data

US 2004/0050440 A1    Mar. 18, 2004

(30) Foreign Application Priority Data

Jul. 23, 2002 (DE) .......................... 202 11 150 U

(51) Int. Cl.[7] .............................................. F16L 55/00
(52) U.S. Cl. .................... 138/109; 138/121; 138/122; 285/903; 285/256; 285/242
(58) Field of Search ................ 138/109, 121, 138/122; 285/903, 256, 259, 252, 253, 242

(56) References Cited

U.S. PATENT DOCUMENTS

| | | | |
|---|---|---|---|
| 817,060 A | * | 4/1906 | Greenfield .................. 285/116 |
| 3,257,132 A | * | 6/1966 | Lyons ......................... 285/253 |
| 3,420,553 A | * | 1/1969 | Poxon et al. ................. 285/49 |
| 4,063,757 A | * | 12/1977 | Fuhrmann ................. 285/222.1 |
| 4,369,992 A | * | 1/1983 | Fournier et al. ............. 285/256 |
| 4,400,022 A | * | 8/1983 | Wright ........................ 285/256 |
| 4,415,389 A | * | 11/1983 | Medford et al. .............. 156/91 |
| 5,209,267 A | * | 5/1993 | Morin ......................... 138/109 |
| 5,297,586 A | * | 3/1994 | McIntosh ..................... 138/109 |

FOREIGN PATENT DOCUMENTS

| | | | | |
|---|---|---|---|---|
| DE | 29807448 U1 | * | 10/1998 | ........... F16L 11/04 |
| GB | 2065823 A | * | 7/1981 | ........... F16L 11/08 |

* cited by examiner

*Primary Examiner*—Patrick Brinson
(74) *Attorney, Agent, or Firm*—Koda & Androlia

(57) ABSTRACT

A flexible conduit includes a metal hose provided with a helical groove having a plurality of turns; a plastic jacket surrounding the metal hose and conforming to the helical groove thereof; a plastic inner hose received in the metal hose and having a projecting length portion extending beyond an end of the metal hose. The conduit further includes a plastic coupling part which surrounds the metal hose. The coupling part includes a cylindrical collar surrounding the projecting length portion and having a material-to-material bond therewith; and an overlapping portion adjoining the cylindrical collar and extending away therefrom. The overlapping portion surrounds the jacket and extends into the helical groove. The overlapping portion and the plastic jacket have a material-to-material bond with one another.

12 Claims, 1 Drawing Sheet

FLEXIBLE CONDUIT, PARTICULARLY FOR SANITARY PURPOSES

BACKGROUND OF THE INVENTION

This invention relates to a flexible conduit, particularly for sanitary use, and is of the conventional type that has a helically grooved metal hose, a plastic inner hose loosely received in the metal hose and a plastic coupling part which is welded (injection molded) to the plastic inner hose. The coupling part has a sleeve-like overlapping portion which overlaps the metal hose and which at least indirectly projects into the helical groove of the metal hose.

Helically grooved metal hoses which are flexible due to their construction are widely used and they particularly excel because of their robust nature. In particular, in the sanitary field chromium-plated or colored metal hoses have been used as shower hoses or generally as sanitary hoses.

As described, for example, in German Patent Document No. 298 07 448 U1, the conduit includes an outer metal hose provided with a helical groove and a plastic inner hose (for example., a PVC hose) loosely received in the metal hose. The plastic inner hose is not affixed along its circumference to the metal hose, it is only in circumferential contact therewith to provide for a desired flexibility while ensuring its resistance to pressure and buckling.

A connection between the metal hose and the plastic inner hose is effected only by an injection molded, plastic, profiled coupling member which has a radial flange to be attached by a sleeve nut to a counter-member. The radial flange is welded to the end face of the plastic hose by the injection molding process during manufacture.

In addition, an inner overlapping portion, formed on the coupling part, extends along a portion of the inner circumference of the plastic inner hose. Such an inner overlapping portion should be thin so as not to appreciably reduce the inner cross-sectional area of the plastic inner hose. Further, the coupling part has a sleeve-like outer overlapping portion which surrounds the metal hose and extends to a short distance therealong. As a result of the injection molding of the coupling part, a glued bond between the outer overlapping portion of the coupling part and the metal hose is intended to take place. Particularly, however, a form fit is effected as the material, forming the outer overlapping portion of the coupling part, projects into the helical groove of the metal hose.

It has been found, however, that, disadvantageously, the coupling part does not always connect the metal hose and the plastic inner hose in a reliably hermetic and tension-proof manner.

A conventional flexible sanitary conduit of the above-outlined type has further drawbacks. Thus, the deep helical groove provided in the external metal hose is difficult to clean or to maintain clean. Also, during use the metal hose may cause annoying noises as it knocks against a bathtub or shower stall and may scratch the surfaces thereof. Further, many users find unpleasant a skin contact with the surface of the metal hose.

Thus, for avoiding the above disadvantages and to improve such flexible conduit, particularly for use in a sanitary environment, it has been attempted to surround the metal hose with a plastic material. In such structures, however, it has not been successful to couple the conduit components (that is, the metal hose, its plastic jacket and the plastic inner hose) by means of a coupling part such that apart from the required tension resistance of the connection no liquid may penetrate between the three components. Such an occurrence would adversely affect the external appearance of the flexible conduit.

It is noted that plastic-jacketed metal conduits are generally known which serve as protecting sheaths for cables or conductors. In such constructions, however, the problem concerning the sealing of conduit components necessary in the sanitary field does not arise.

For avoiding additional disadvantages in conventional metal hoses, flexible conduits have been developed which have no metal hose, but which essentially include a plastic outer hose, a plastic inner hose and at least one helical, particularly plastic, reinforcement which is disposed between the two plastic hoses. The reinforcement may contain chrome colors, lending such flexible conduits the appearance of metal hoses. Such a solution, however, while answering an aesthetic problem, does not by itself provide the robust nature of a metal hose for conduits consisting of an assembly of only plastic components.

In a flexible conduit whose outer and inner walls (that is, the outer hose and the inner hose) are formed of an elastomer and whose outer hose covers a helical hollow space, a coupling part anchored to the conduit wall is provided for sealing the helical hollow space in the outer hose wall and to ensure a mechanically reliable hose coupling. Such a construction is described in German Patent Document No. 26 54 377 C3. The helical hollow space is bordered by a helical wire and a strip between the outer and inner walls. The coupling part is formed of a one-piece injection molded member which includes a profiled coupling shaped as an annular flange, a cylindrical part having a material thickness equaling that of the conduit, an adjoining cylindrical part in a region in which only the reinforcement and possibly the outer wall of the conduit are removed and a helical run-out terminus in the helical hollow space of the conduit. The material of the coupling part injection molded on the hose is the same as that of the conduit components. The material of the coupling part, however, does not extend overlappingly over the outer circumference of the outer hose.

German Patent Document No. 30 49 501 C2 describes a different coupling part injection molded to the end of a plastic conduit, particularly for sanitary use. The conduit is composed of an inner hose and an outer hose between which a helically wound insert is disposed. The insert is essentially formed of a metalized polyester film spray-coated with hard PVC. The purpose of the insert is to lend the plastic conduit the appearance of a metal conduit. Due to the insert the outer hose has external depressions and crests. The coupling part is injection molded to the conduit end in such a manner that externally on the outer hose a sleeve-like overlapping part is formed which extends into the depressions of the outer hose and constitutes an integral portion of the coupling part. The material of the injection molded coupling part and that of the extruded conduit is so selected that by means of the form fit resulting from the injection molding of the coupling part a homogenization between the material of the coupling part and the material of the outer hose is obtained for further enhancing the bond between the coupling part and the conduit. In particular, the coupling part is formed of hard PVC which, however, is unsuitable as a sealing material, since it undergoes plastic deformation under heat. Thus, this construction does not solve the problem of providing a reliable bond between a metal hose and the coupling part.

For the purpose of satisfactorily sealing a flexible conduit of the above-described type, having an elastomer or thermoplastic outer hose and an inner hose provided with a coupling part, according to German Patent Document No. 31

10 494 C2, to which corresponds U.S. Pat. No. 4,526,410, the coupling part, in addition to an outer overlapping sleeve, also includes an inner sleeve which extends on the inside of the inner hose beyond the outer sleeve in the longitudinal direction of the conduit. As a result, the effective sealing faces defined by portions of the coupling part engaging the outer and inner hoses are particularly large. Further, the inner sleeve is sought to provide an effective support for the conduit in the coupling part region where the mechanical stresses are particularly substantial. In such a flexible conduit, however, the inner sleeve unavoidably reduces the inner diameter of the inner hose, disadvantageously resulting in an increase of the flow resistance.

SUMMARY OF THE INVENTION

It is an object of the invention to provide an improved flexible conduit of the earlier described type in which an outer metal hose and a loosely positioned plastic inner hose are, by means of a coupling part, reliably connected to one another to form an undetachable, tension proof and production friendly unit. The connection is effected in such a manner that the flexible conduit is outwardly hermetically sealed and the conduit components too, are sealed from one another without a constriction of the inner cross-sectional area in the region of the coupling. As part of the production friendly nature of the flexible conduit a large choice of plastic materials for making the conduit components is available.

This object and others to become apparent as the specification progresses, are accomplished by the invention, according to which, briefly stated, the flexible conduit includes a metal hose provided with a helical groove having a plurality of turns; a plastic jacket surrounding the metal hose and conforming to the helical groove thereof; a plastic inner hose received in the metal hose and having a projecting length portion extending beyond an end of the metal hose. The conduit further includes a plastic coupling part which surrounds the metal hose. The coupling part includes a cylindrical collar surrounding the projecting length portion and having a material-to-material bond therewith; and an overlapping portion adjoining the cylindrical collar and extending away therefrom. The overlapping portion surrounds the jacket and extends into the helical groove. The overlapping portion and the plastic jacket have a material-to-material bond with one another.

By virtue of the structure of the coupling part according of the invention a reliable, sealed connection is ensured between the conduit components in the coupling region even if the coupling part does not extend in a helical hollow space or threaded hollow space formed between the metal hose and the plastic inner hose. Thus, the plastic inner hose may lie loosely, but relatively snugly against the inner face of the jacketed metal hose. By means of the outer plastic jacket of the metal hose a very satisfactory material-to-material bond with the overlapping sleeve of the injection molded coupling part may be effected. Thus the material of the coupling part does not have to be chosen with the purpose of gluing the overlapping sleeve of the coupling part with the metal material of the metal hose. The obtained material-to-material bond between the plastic jacket of the metal hose and the plastic coupling part is substantially more secure than a mere form fit between the coupling part and a metal hose. Also, a tension resistant and sealed connection between the outer surface of the plastic inner hose and the injection molded coupling component is ensured by the fact that the plastic inner hose has a projecting portion which extends beyond the end of the metal hose. The projecting portion of the plastic inner hose has a large area for a material-to-material bond between a cylindrical collar of the coupling part and the plastic inner hose. The choice of material for the coupling component to be injection molded, the plastic jacket of the metal hose and the plastic inner hose may be made from the large group of polyolefins, including polyethylene and polypropylene; such a choice is not possible in case of known plastic conduits which have a PVC component.

According to an advantageous feature of the invention the tension-resistant, sealed connection between the conduit components is further improved. Such a feature provides that prior to the injection molding of the coupling part, between the outer circumferential surface of the plastic inner hose and the inner circumferential surface of the jacketed metal hose a hollow space is formed. The hollow space extends continuously about the outer circumferential surface of the plastic inner hose and is outwardly bordered by the inner helical groove of the metal hose. Subsequent to the injection molding of the coupling part a terminal portion of the hollow space along an end portion of the metal hose is filled by a throughgoing, run-out threaded portion of the coupling part as an extension of its cylindrical collar. In this construction the run-out threaded portion of the coupling part is in a material-to-material bond with an outer circumferential surface of a length portion of the plastic inner hose and extends in a form-fitting manner into an inside terminal length portion of the metal hose. The noted length portion of the inner hose bonded to the threaded portion of the coupling part longitudinally adjoins that portion of the inner hose which projects beyond the end of the metal hose. The radial distance between the outer circumference of the plastic inner hose and the inner face of the jacketed metal hose is so dimensioned prior to the injection molding of the coupling part that during the injection molding, part of the liquid plastic material present in the hollow space formed between the plastic inner hose and the metal hose may flow past the inner helical groove of the metal hose even at the relatively narrowest locations. It is feasible to provide such a large distance between the metal hose and the plastic inner hose, since it is not intended to attach the metal hose along its length directly with the plastic inner hose. Such an attachment would, among others, result in the disadvantage of an excessive stiffness of the connection. The run-out threaded portion of the coupling part situated in the hollow space between the metal hose and the plastic inner hose is bounded, in a radially inward zone, in a continuous, cylindrical manner and further extends, in a radially outward zone, in a thread-shaped manner at the inner face of the metal hose. The run-out threaded portion additionally anchors the coupling part to the metal hose similarly to a screw connection.

According to a further feature of the invention the portion of the plastic inner hose projecting beyond the end of the metal hose is expediently 0.3–1 cm for establishing a material-to-material bond with the coupling part. The portion of the integral coupling part formed on the projecting portion of the plastic inner hose is a cylindrical collar which changes into a radial end flange of the coupling part.

The threaded portion of the coupling part adjoining the collar as a one-piece member therewith, extends around at least one turn, but advantageously around two to three turns of the inner helical groove of the metal hose.

While, as noted earlier, a wide choice of polyolefin elastomers is available for the material of the plastic jacket of the metal hose, the plastic inner hose and the coupling part, it is feasible to make these conduit components of polyurethane. The coupling part may be prepared with a basically conventional injection molding process.

According to another feature of the invention, however, the plastic jacket of the metal hose and the plastic inner hose may be PVC, while the coupling part may be a polyester elastomer. The latter bonds in a highly satisfactory manner with the two PVC components of the conduit. Likewise suitable is a polyurethane coupling part.

Apart from the above-noted choice of material from polyolefin elastomers for the plastic jacket of the metal hose, the plastic inner hose and the coupling part, other combinations of synthetic materials for these three plastic conduit components may be available. When selecting the material for the coupling part care has to be taken that the coupling part has a sufficient elasticity to ensure a satisfactory sealing function of its radial flange.

According to a further advantageous feature of the invention the strength and seal of the material-to-material bond of the conduit components at the ends of the conduit may be further improved by providing, in addition to an outer sleeve surrounding the coupling part, an inner sleeve positioned inside the plastic inner hose. The inner sleeve, when introduced into the plastic inner hose has an outer diameter that equals the inner diameter of the plastic inner hose. Subsequently the inner sleeve is radially expanded such that its inner diameter will not be smaller than the original inner diameter of the plastic inner hose. In this manner the coupling part is compressed between the inner sleeve, the plastic inner hose, the jacketed metal hose and the outer sleeve without necessitating a reduction in the cross-sectional flow area of the conduit.

DESCRIPTION OF THE PREFERRED EMBODIMENTS

Figure 1:
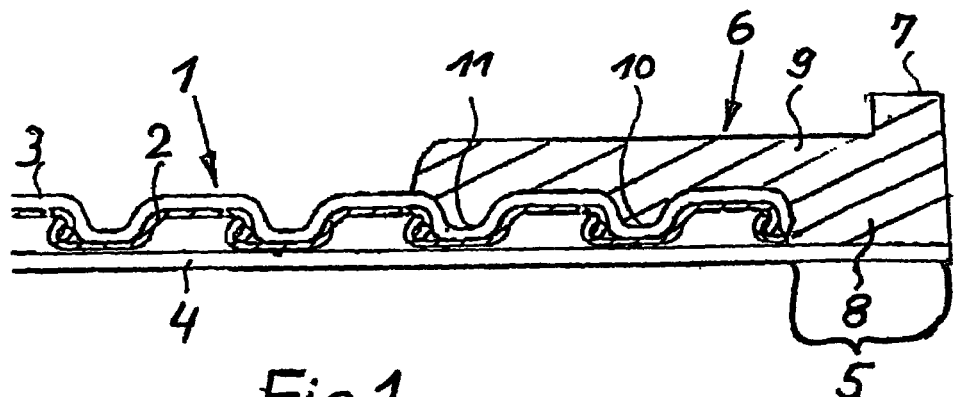
FIG. 1 is a fragmentary axial sectional view of a first preferred embodiment of the invention, particularly for use as a shower hose.
Figure 2:
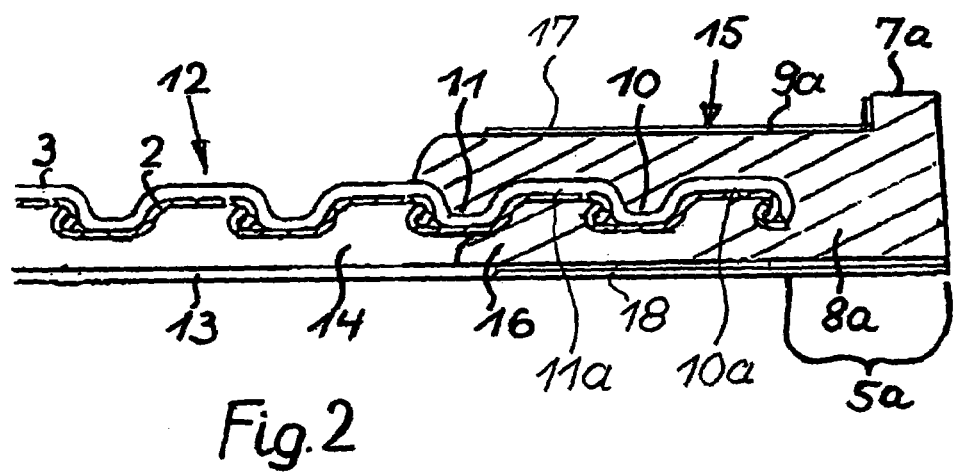
FIG. 2 is a fragmentary axial sectional view of a second preferred embodiment of the invention, particularly for use as a shower hose.

The flexible conduits of the two embodiments of the invention to be described hereafter in conjunction with FIGS. 1 and 2, respectively, find particular use as shower hoses.

Turning to the first preferred embodiment illustrated in FIG. 1, the flexible conduit generally designated at 1 includes a metal hose 2 of helically wound construction. The metal hose 2 accommodates a plastic inner hose 4 such that the latter projects with a hose portion 5 beyond an end of the metal hose 2. The outer diameter of the plastic inner hose 4 is only slightly smaller than the inner diameter of the metal hose 2 to ensure that the plastic inner hose 4, as illustrated, practically lies against the inside of the metal hose 2.

To obtain a resistant, smooth, non-metallic outer surface for the flexible conduit 1, the metal hose 2 is provided with a jacket 3 made, in particular, of transparent polyurethane. Expediently, the plastic inner hose 4 is also made of polyurethane. To ensure a highly satisfactory material-to-material bond with the jacket 3 and the projecting portion 5 of the plastic inner hose 4, a polyurethane coupling part generally designated at 6 is injection molded on a terminal length portion of the jacket 3 and the projecting portion 5 of the plastic inner hose 4. The coupling part 6 includes a cylindrical collar 8 formed about the projecting hose portion 5. The collar 8 extends between the end of the jacketed metal hose 2 and an outer end face of a radial flange 7 which also forms a portion of the coupling part 6. For using the completed flexible hose 1, a sleeve nut (not shown in FIG. 1) may be inserted over the radial flange 7 for hermetically attaching the flexible conduit 1 to an external implement. In the region of the sleeve nut the flexible conduit 1 is expediently provided with a reinforcement, usually an outer metal sleeve (also not shown in FIG. 1). The coupling part 6 further comprises an outer, overlapping portion 9 for surrounding a terminal length portion of the jacketed metal hose 2. The overlapping portion 9 extends in a form fitting manner and with the intermediary of the jacket 3, into two turns 10 and 11 of the helical groove formed in the metal hose 2. It is essential in this construction that the overlapping portion 9 assumes a material-to-material bond with the jacket 3 of the metal hose 2. For this purpose, in the present example both components 3 and 6 are polyurethane.

Turning to the second preferred embodiment illustrated in FIG. 2, the flexible conduit shown therein and generally designated at 12 may use the same metal hose 2 surrounded by a jacket 3 as the construction described in connection with FIG. 1. Because of the corrugated configuration of the metal hose 2 as viewed in longitudinal section, the metal hose has a helical outer groove including the groove turns 10, 11 and a helical inner groove including groove turns 10a, 11a. The FIG. 2 embodiment, however, differs from that of FIG. 1 in that the jacketed metal hose 2 receives a plastic inner hose 13 whose outer diameter is significantly smaller than the smallest inner diameter of the metal hose 2. Consequently, as the plastic inner hose 13 is held coaxially within the metal hose 2, a continuous hollow space 14 is formed which is bordered, on the one hand, by the outer circumferential surface of the plastic inner hose 13 and, on the other hand, by the helically grooved inner circumferential surface of the metal hose 2.

As a result of the above-described configuration of the hollow space 14, during the injection molding of the coupling part generally designated at 15, not only those portions are formed which characterize the embodiment of FIG. 1, but also, adjoining the cylindrical collar 8a, a threaded sleeve portion 16 is obtained which extends away from the projecting portion 5a of the plastic inner hose 13 and is surrounded by the jacketed metal hose 2. The threaded portion 16 is continuous where it adjoins the plastic inner hose 13 and is, on its radially outward circumferential surface, of helical configuration by virtue of the inner helical groove of the metal hose 2. This is so, because during injection molding of the coupling part 15 the liquid plastic material penetrates into the hollow space 14 and fills the same beyond the groove turn 11a. The threaded portion 16 thus anchors the coupling part 15 to the end of the flexible conduit 12, in addition to the material-to-material bonds of the coupling part 15 with the projection 5a of the plastic inner hose 13 and the jacket 3 of the metal hose 2. Externally of the threaded sleeve portion 16, however, the metal hose 2 is separated from the plastic inner hose 13 by the hollow space 14 ensuring that the flexibility of the plastic inner hose 13 is not adversely affected.

An external sleeve 17 is pushed over the overlapping portion 9a, and an inner sleeve 18 is introduced into the plastic inner hose 13. The external and internal sleeves 17, 18 have essentially the same axial length as the overlapping portion 9a. Expediently, prior to insertion, the outer diameter of the inner sleeve 18 is only slightly smaller than the inner diameter of the plastic inner hose 13. By radially expanding the inner sleeve 18 which is made of a permanently deformable material, such as brass, the outer diameter of the inner sleeve 18 will become greater than the inner diameter of the plastic inner hose 13 and the inner diameter of the inner sleeve 18 is increased to become essentially equal to the inner diameter of the plastic inner hose 13. As the result of such a radial expansion of the inner sleeve 18, the coupling part 15, the plastic inner hose 13 and the jacket 3 of the metal hose 2 are compressed radially inwardly of the outer sleeve 17, whereby optimal tension resistant and sealing properties of the coupling are achieved, and the original inner cross-sectional area of the plastic inner hose 13 is not reduced.

It is noted that an outer sleeve 17 and an inner sleeve 18 as described in connection with the embodiment of FIG. 2 may also be applied in the same manner to the embodiment of FIG. 1.

It will be understood that the above description of the present invention is susceptible to various modifications, changes and adaptations, and the same are intended to be comprehended within the meaning and range of equivalents of the appended claims.

What is claimed is:

1. A flexible conduit comprising
   (a) a metal hose provided with a helical groove having a plurality of turns; said metal hose having an end;
   (b) a plastic jacket surrounding said metal hose and conforming to the helical groove thereof;
   (c) a plastic inner hose received in said metal hose and having a projecting length portion extending beyond said end of said metal hose; and
   (d) a plastic coupling part surrounding said metal hose and including
      (1) a cylindrical collar surrounding said projecting length portion and having a material-to-material bond therewith; and
      (2) an overlapping portion adjoining said cylindrical collar and extending away therefrom; said overlapping portion surrounding said jacket and extending into said helical groove; said overlapping portion and said plastic jacket having a material-to-material bond with one another.

2. The flexible conduit as defined in claim 1, wherein said coupling part is injection molded on said plastic jacket of said metal hose and said projecting portion of said plastic inner hose.

3. The flexible conduit as defined in claim 1, wherein said plastic inner hose is in a bondless contact with said metal hose.

4. The flexible conduit as defined in claim 1 wherein said overlapping length portion of said plastic inner hose has an axial length between 0.3 and 1 cm.

5. The flexible conduit as defined in claim 1, wherein said jacket, said plastic inner hose and said coupling part are of polyurethane.

6. The flexible conduit as defined in claim 1, wherein said jacket and the plastic inner hose are of PVC and the coupling part is an injection molded member having a material selected from the group consisting of a polyester elastomer and polyurethane.

7. The flexible conduit as defined in claim 1, wherein said jacket, said plastic inner hose and said coupling part are of a polyolefin elastomer.

8. The flexible conduit as defined in claim 1, wherein said overlapping portion of said coupling part extends over 2 to 3 turns of said helical groove of said metal hose.

9. The flexible conduit as defined in claim 1, wherein said helical groove is an external helical groove provided in an outer circumferential surface of said metal hose; said metal hose further comprising an internal helical groove provided in an inner circumferential surface of said metal hose; said inner circumferential surface of said metal hose and an outer circumferential surface of said plastic inner hose define a space therebetween; further wherein said coupling part includes an inner sleeve portion situated in said space along a terminal length portion of said metal hose; said inner sleeve portion adjoining said collar and having a material-to-material bond with said outer circumferential surface of said plastic inner hose; said inner sleeve portion extending into said internal helical groove of said metal hose, whereby said inner sleeve portion has a threaded outer configuration being in a form-fitting relationship with said metal hose; said overlapping portion, said collar and said inner sleeve portion of said coupling part forming a one-piece, injection molded member.

10. The flexible conduit as defined in claim 9, wherein said inner sleeve portion extends over at least one turn of said inner helical groove of said metal hose.

11. The flexible conduit as defined in claim 1, further comprising an outer sleeve surrounding said coupling part; an inner sleeve surrounded by said plastic inner hose and situated radially inwardly of said coupling part; said inner sleeve having an outer diameter greater than an inner diameter of said plastic inner hose for compressing said coupling part, said plastic inner hose, said metal hose and said jacket between said outer and inner sleeves.

12. The flexible conduit as defined in claim 11, wherein said inner sleeve has an inner diameter substantially equal to the inner diameter of said plastic inner hose.

* * * * *